United States Patent
Jeong et al.

(10) Patent No.: US 12,313,803 B2
(45) Date of Patent: May 27, 2025

(54) AUTOMATED OFFSET WELL ANALYSIS

(71) Applicant: Schlumberger Technology Corporation, Sugar Land, TX (US)

(72) Inventors: Cheolkyun Jeong, Katy, TX (US); Francisco Jose Gomez, Abingdon (GB); Maurice Ringer, London (GB); Paul Bolchover, Beijing (CN); Paul Muller, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/354,017

(22) Filed: Jul. 18, 2023

(65) Prior Publication Data

US 2023/0358912 A1 Nov. 9, 2023

Related U.S. Application Data

(63) Continuation of application No. 17/450,419, filed on Oct. 8, 2021, now Pat. No. 11,747,502, which is a
(Continued)

(51) Int. Cl.
*G01V 1/50* (2006.01)
*G06N 5/046* (2023.01)
*G06N 20/00* (2019.01)

(52) U.S. Cl.
CPC .............. *G01V 1/50* (2013.01); *G06N 5/046* (2013.01); *G06N 20/00* (2019.01); *G01V 2200/16* (2013.01); *G01V 2210/63* (2013.01)

(58) Field of Classification Search
CPC .. G01V 1/50; G01V 2200/16; G01V 2210/63; G01V 2210/66; G06N 5/046;
(Continued)

(56) References Cited

U.S. PATENT DOCUMENTS

| | | | |
|---|---|---|---|
| 9,934,338 B2 | 4/2018 | Germain et al. | |
| 10,280,732 B2 | 5/2019 | Dursun et al. | |
| 10,900,343 B1 * | 1/2021 | Buerger | E21B 44/02 |
| 11,740,384 B2 * | 8/2023 | Fox | G01V 1/282 |
| | | | 166/250.01 |

(Continued)

FOREIGN PATENT DOCUMENTS

| | | |
|---|---|---|
| CN | 104806226 A | 7/2015 |
| CN | 106150476 A | 11/2016 |

(Continued)

OTHER PUBLICATIONS

Bello et al. (Application of Artificial Intelligence Techniques in Drilling System Design and Operations: A State of the Art Review and Future Research Pathways, 2016) (Year: 2016).*
(Continued)

*Primary Examiner* — Mohammad K Islam
(74) *Attorney, Agent, or Firm* — Michael West; Jeffrey D. Frantz

(57) ABSTRACT

A system and method that includes querying a database to obtain offset well data collected while drilling previously drilled wells. The system and method also include determining if at least one risk is identified with respect to a planned well based on the offset well data. The system and method additionally include generating a machine learning model based on the at least one risk that is identified based on the offset well data. The system and method further include predicting at least one drilling risk based on the machine learning model, wherein a drill plan that includes drilling parameters is adjusted based on the at least one predicted drilling risk.

18 Claims, 10 Drawing Sheets

Related U.S. Application Data continuation of application No. 16/407,186, filed on May 9, 2019, now Pat. No. 11,143,775.

(58) Field of Classification Search
CPC .......... G06N 20/00; G06N 7/01; G06N 3/006; E21B 2200/22; E21B 47/00
See application file for complete search history.

(56) References Cited

U.S. PATENT DOCUMENTS

| | | |
|---|---|---|
| 2013/0341093 A1 | 12/2013 | Jardine et al. |
| 2014/0365409 A1 | 12/2014 | Burch et al. |
| 2017/0191359 A1 | 7/2017 | Dursun et al. |
| 2018/0114158 A1 | 4/2018 | Foubert et al. |
| 2018/0171774 A1* | 6/2018 | Ringer .................. E21B 47/002 |
| 2019/0345809 A1* | 11/2019 | Jain ....................... E21B 44/005 |
| 2020/0248547 A1* | 8/2020 | Fitzgerald ............. E21B 47/002 |
| 2020/0355839 A1 | 11/2020 | Jeong et al. |
| 2022/0026596 A1 | 1/2022 | Jeong et al. |

FOREIGN PATENT DOCUMENTS

| | | |
|---|---|---|
| WO | 2008089345 A1 | 7/2008 |
| WO | 2015116101 A1 | 8/2015 |

OTHER PUBLICATIONS

Ashok et al. (Automatic sensor data validation: improve the quality and reliability of rig data, 2013) (Year: 2013).*

International Search Report and Written Opinion mailed Aug. 20, 2020 in International Application No. PCT/US2020/032320, 10 pages.

Abimbola_et_al_safety and risk analysis of managed pressure drilling operations using Bayesian network_2015.

International Preliminary Report on Patentability issued in International Application PCT/US2020/032320 dated Nov. 18, 2021, 7 pages.

Paltrinieri, N. et al., "Learning about risk: Machine learning for risk assessment", Safety Science, 2019 118, pp. 475-486.

Mohan, R. et al., "Data Drive and AI Methods to Enhance Collaborative Well Planning and Drilling Risk Prediction", SPE-203073-MS, presented virtually at the Abu Dhabi International Petroleum Exhibition Conference, Abu Dhabi, 2020, 8 pages.

Extended Search Report issued in European Patent Application No. 20801997.6 dated Dec. 2, 2022, 10 pages.

Communication pursuant to Article 94(3) issued in EP Patent Application No. 20801997.6 dated Oct. 9, 2023, 6 pages.

* cited by examiner

AUTOMATED OFFSET WELL ANALYSIS

This application is a continuation of a co-pending U.S. patent application having a Ser. No. 17/450,419 filed on 8 Oct. 2021 (published as US 2022/0026596 published on 27 Jan. 2022), which is a continuation of Ser. No. 16/407,186 filed on 9 May 2019 (issued as U.S. Pat. No. 11,143,775 issued on 12 Oct. 2021) entitled "Automated Offset Well Analysis" which is incorporated by reference in its entirety.

BACKGROUND

In the oil and gas industry, offset well information obtained from already-drilled neighbor wells provides data that can be analyzed in order to decrease the uncertainty for a new well. That is, any hazards or risks experienced while drilling the offset well may be used to guide the planning and development of the new well.

Currently, this analysis relies on human drilling engineers to execute a manual process of risk identification. In general, the engineers gather the offset well information and empirically project a potential risk in drilling the new well. The drilling parameters, well location and/or trajectory, etc. can then be modified to minimize such risk. Thus, this analysis provides a rough guidance for drill planning or operation.

The accuracy of this guidance often turns out to be low in practice, however. This may be partially caused by relying on qualitative and manual forecasting of the risk based on human intuition. Based on the qualitative probability and severity, the offset well risk is computed and the results are used for prediction of a new well. As such, the analysis is subject to variations due to human subjectivity and levels of skill and experience. Furthermore, the experienced risks may not be calibrated for the differences between the offset well and the new well, and thus the risk events in the new well may occur at a different depth and/or with different severity based on the different characteristics of the wells. Accordingly, there remains a relatively high level of uncertainty in the application of the offset well analysis.

SUMMARY

Embodiments of the disclosure may provide a method that includes querying a database to obtain offset well data collected while drilling previously drilled wells. The method also includes determining if at least one risk is identified with respect to a planned well based on the offset well data. The method additionally includes generating a machine learning model based on the at least one risk that is identified based on the offset well data. The method further includes predicting at least one drilling risk based on the machine learning model, wherein a drill plan that includes drilling parameters is adjusted based on the at least one predicted drilling risk.

Embodiments of the disclosure may also provide a system that includes a processor, a memory accessible by the processor, and processor-executable instructions stored in the memory and executable to instruct the system to query a database to obtain offset well data collected while drilling previously drilled wells. The instructions are also executable to instruct the system to determine if at least one risk is identified with respect to a planned well based on the offset well data. The instructions are additionally executable to instruct the system to generate a machine learning model based on the at least one risk that is identified based on the offset well data. The instruction are further executable to instruct the system to predict at least one drilling risk based on the machine learning model, wherein a drill plan that includes drilling parameters is adjusted based on the at least one predicted drilling risk.

Embodiments of the disclosure may further provide non-transitory computer-readable storage medium storing instructions that when executed by a computer, which includes a processor performs a method that includes querying a database to obtain offset well data collected while drilling previously drilled wells. The method also includes determining if at least one risk is identified with respect to a planned well based on the offset well data. The method additionally includes generating a machine learning model based on the at least one risk that is identified based on the offset well data. The method further includes predicting at least one drilling risk based on the machine learning model, wherein a drill plan that includes drilling parameters is adjusted based on the at least one predicted drilling risk.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
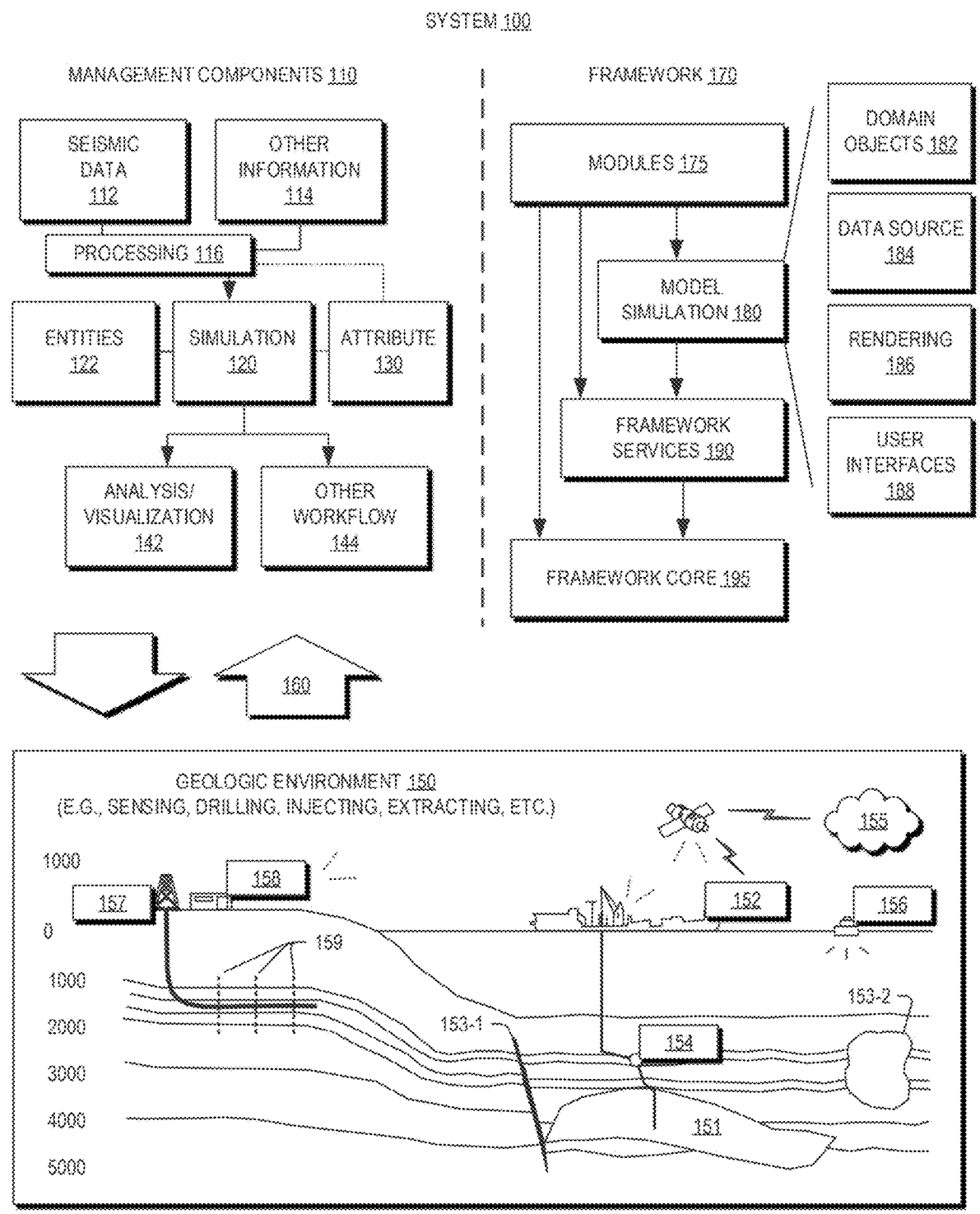
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
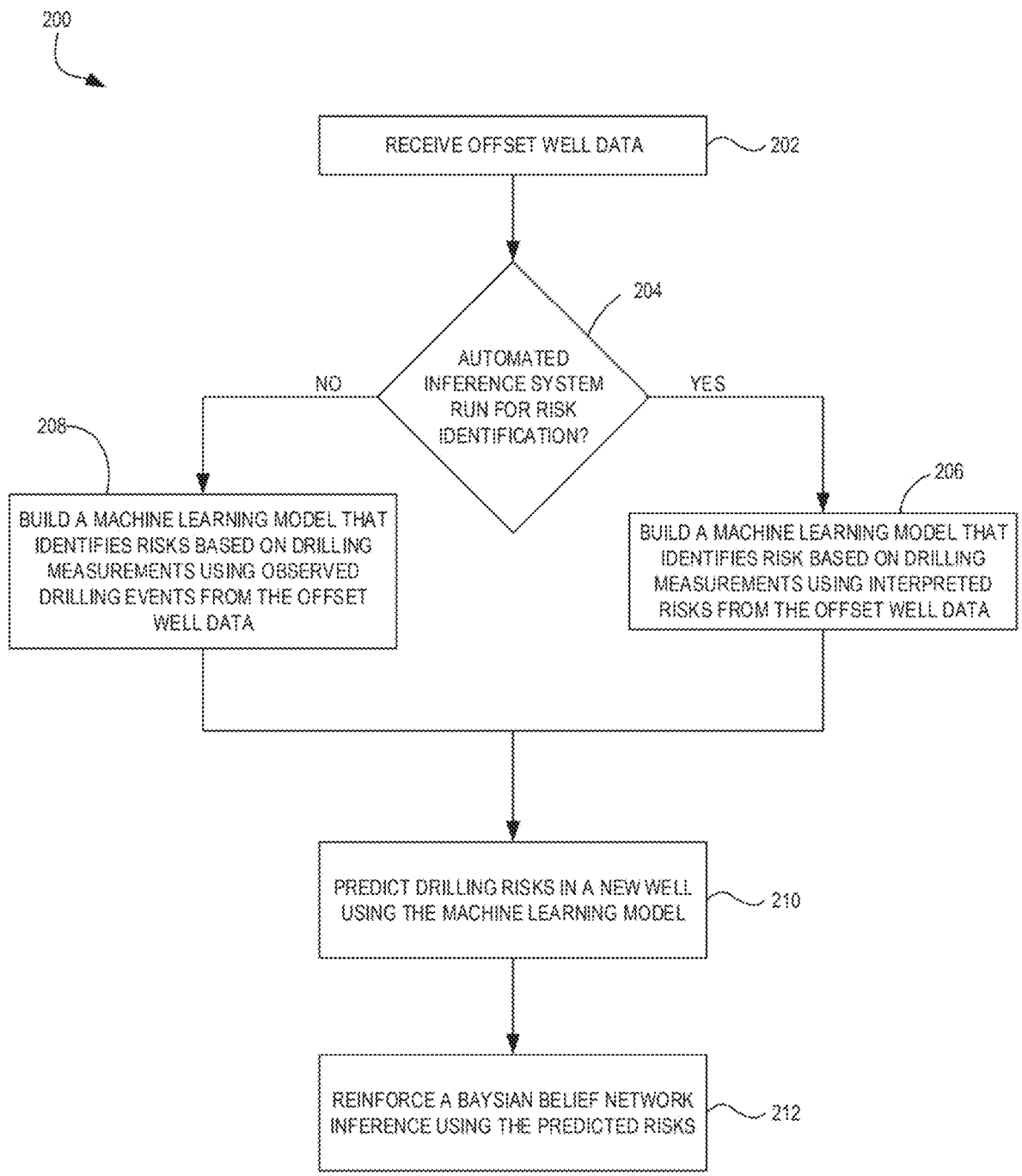
FIG. 2 illustrates a flowchart of a method for planning a well, according to an embodiment.

FIG. 2 illustrates a flowchart of a method 200 for planning a well, according to an embodiment. The method 200 may include receiving offset well data, as at 202. The offset wells may be selected from a database of previously-drilled wells. The database may store risks and/or hazards that were encountered in a previously-drilled well. The risks or hazards may be stored in association with drilling conditions that led to the hazards, e.g., drilling parameters such as over balance pressure, flow rate, rotation rate/speed, depth, weight on bit), as well as wellbore trajectory, geological information about rock formations, etc. Further, the offset well data may be collected from any number of relevant wells, e.g., any wells within a threshold distance and/or of a similar depth, trajectory, etc., as to the planned new well.

Figure 3:
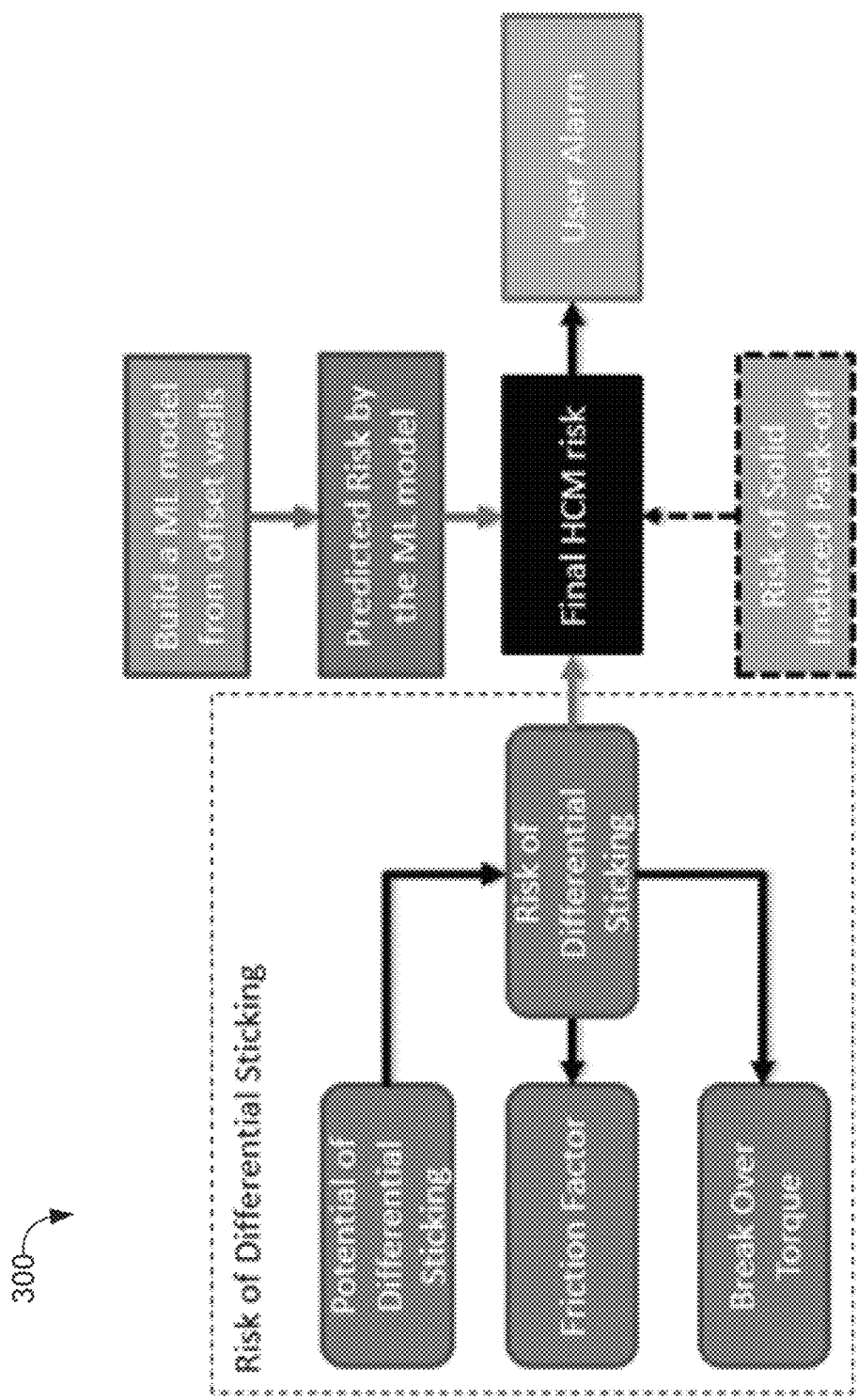
FIG. 3 illustrates a functional block diagram of a Bayesian Belief Network, according to an embodiment.

The method 200 may then proceed to determining whether an automated inference system was run for identifying risks in the wellbore, as at 204. An example of an automated inference system is shown in FIG. 3. In this illustration, a risk of differential sticking is identified based on drilling conditions, but it will be appreciated that this is merely one type of risk that could be identified. Other types of risks that may be identified include solid-induced pack-off risk and geometry risk. The automated risk inference system transforms raw data/measurements into actionable insight. In FIG. 3, for example, a potential of differential sticking agent, a friction factor agent, and a break over torque agent monitor the measured data based on each physics-based model. Based on the computation in each module (agent), the inference system identifies an abnormal situation probabilistically.

The automated inference system is based on a Bayesian belief network and combines the monitored risk probabilistically. Likewise, other the stuck-pipe related risks, such as solid-induced pack-off risk and geometry risk can be modeled and identified by the automated inference system.

The next stage of the method 200 may be to build a machine learning model that identifies risks in a planned well based on drilling measurements and/or parameters. If the automated inference system was run, as determined at 204, the method 200 may include building the machine learning model based on those interpreted risks, as at 206. Otherwise, the method 200 may build the machine learning model based on observed drilling risks, as at 208. The machine learning model may be configured to predict a percentage risk based on the drilling parameters used in the offset well.

With the machine learning model built, the method 200 may proceed to predicting drilling risks in the new well using the machine learning model, as at 210. Such predictions may inform users of likely drilling risks, and thus allow for changed drilling plans (e.g., well location or trajectory, drilling equipment selection, drilling parameters). The predictions may also be used to reinforce a Bayesian Belief Network, as at 212. FIG. 3 illustrates an example of a Bayesian Belief Network (BBN) 300. The BBN 300 combines various probabilities with connected reasons or causes and effects. Using a generic, simplistic example, a BBN can be used to detect lung cancer. Reasons and observations about contracting lung cancer can be used in a BBN, for example, smoking (reason), factory working (reason), X-ray (observation), CT-scan (observation). Then, the BBN can be used to probabilistically compute what the possibility of lung cancer is, based on the reasons and observations. The BBN 300 may proceed in this same manner. The aforementioned physics-based models/modules monitor the specialized problems and report in real-time. Then BBN 300 systematically integrate the information for users.

The reinforcement at 212 may be accomplished using the BBN 300 of FIG. 3. The predicted risks in a pre-drill condition will be used as prior knowledge in hole condition monitoring (HCM) risk computation. The predicted risk is a guide map before drilling whether certain drilling issues observed in offset wells are likely to be experienced in a new well, or not. However, in real-time drilling, the prediction is merged with actual observations and measurements for confirming the drilling problems. In a BBN framework, it is another agent providing 'potential of drilling risks' trained from offset wells nearby.

Figure 4:
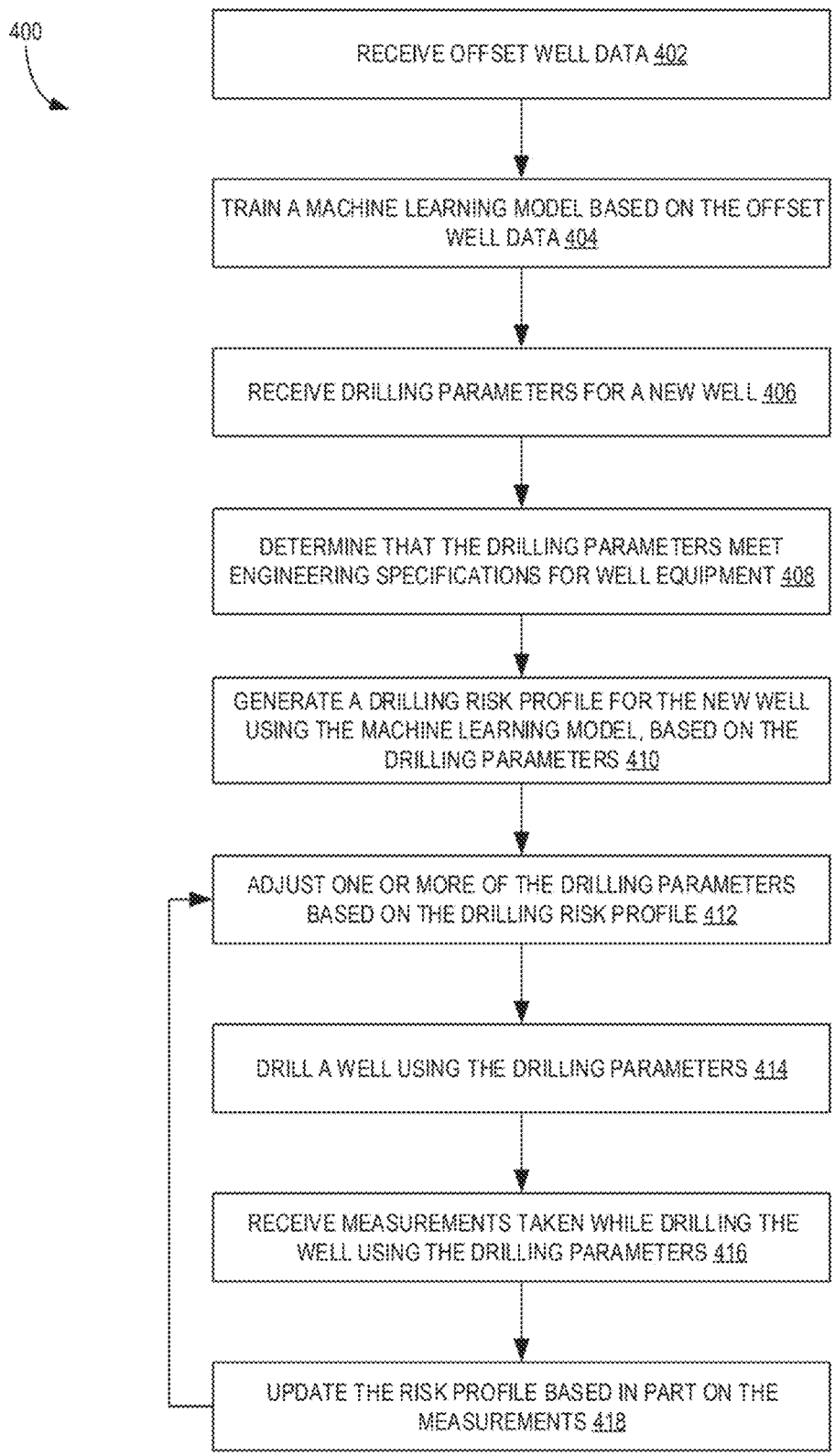
FIG. 4 illustrates a method for drilling a well, according to an embodiment.

FIG. 4 illustrates another flowchart of a method 400 for drilling, according to an embodiment. The method 400 may include receiving offset well data, as at 402. The method 400 may also include training a machine learning model based on the offset well data, as at 404. As noted above, the offset well data may have been processed by an automatic inference system configured to identify risks based on drilling parameters, geology etc. In such case, the offset well data may be considered to include such inference information. In other situations, the offset well data may not have been processed in this manner, and thus the offset well data may include drilling parameters and observed drilling conditions, e.g., including hazards encountered.

Figure 5:
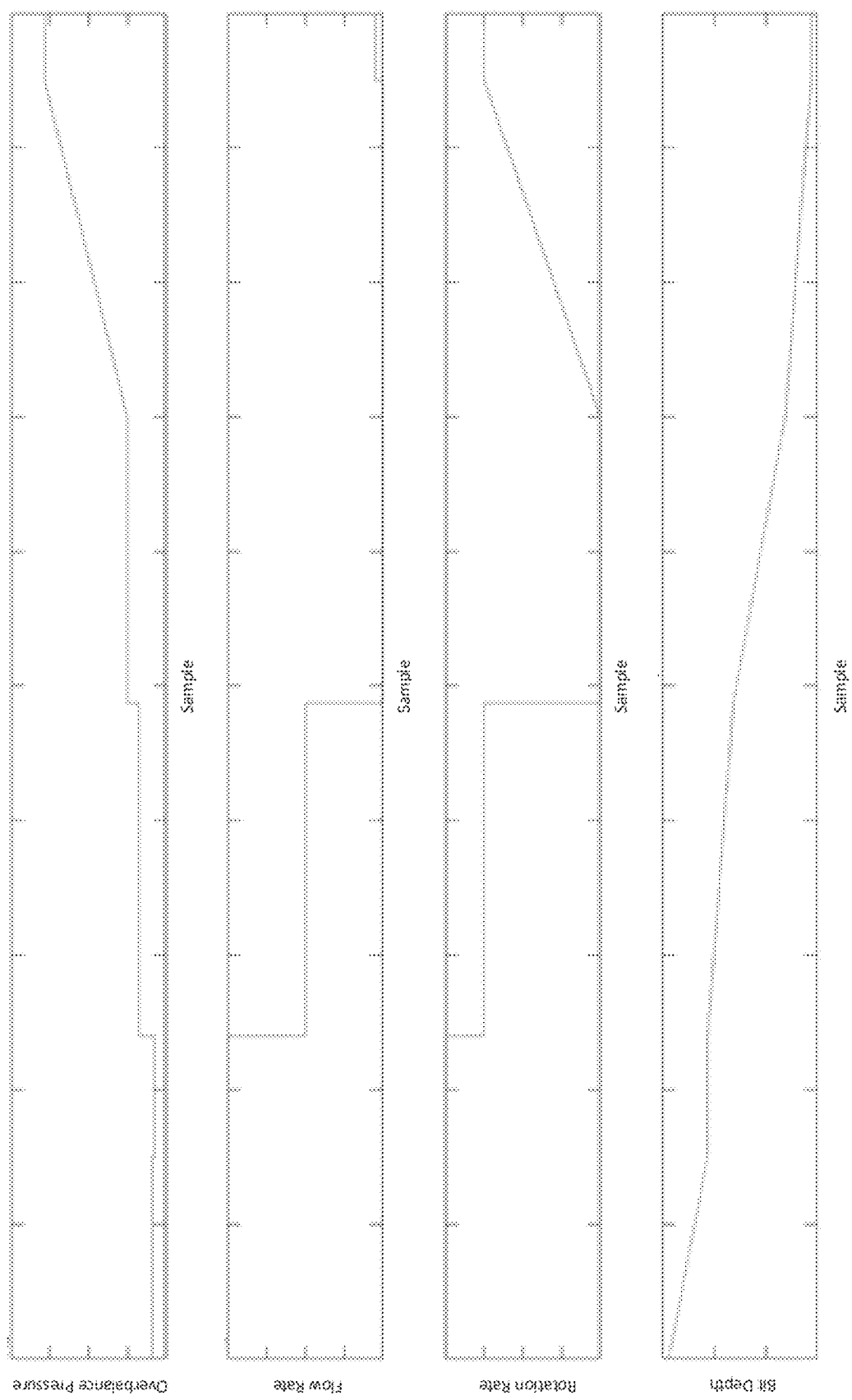
FIG. 5 illustrates plots of examples of drilling parameters, according to an embodiment.
Figure 6:
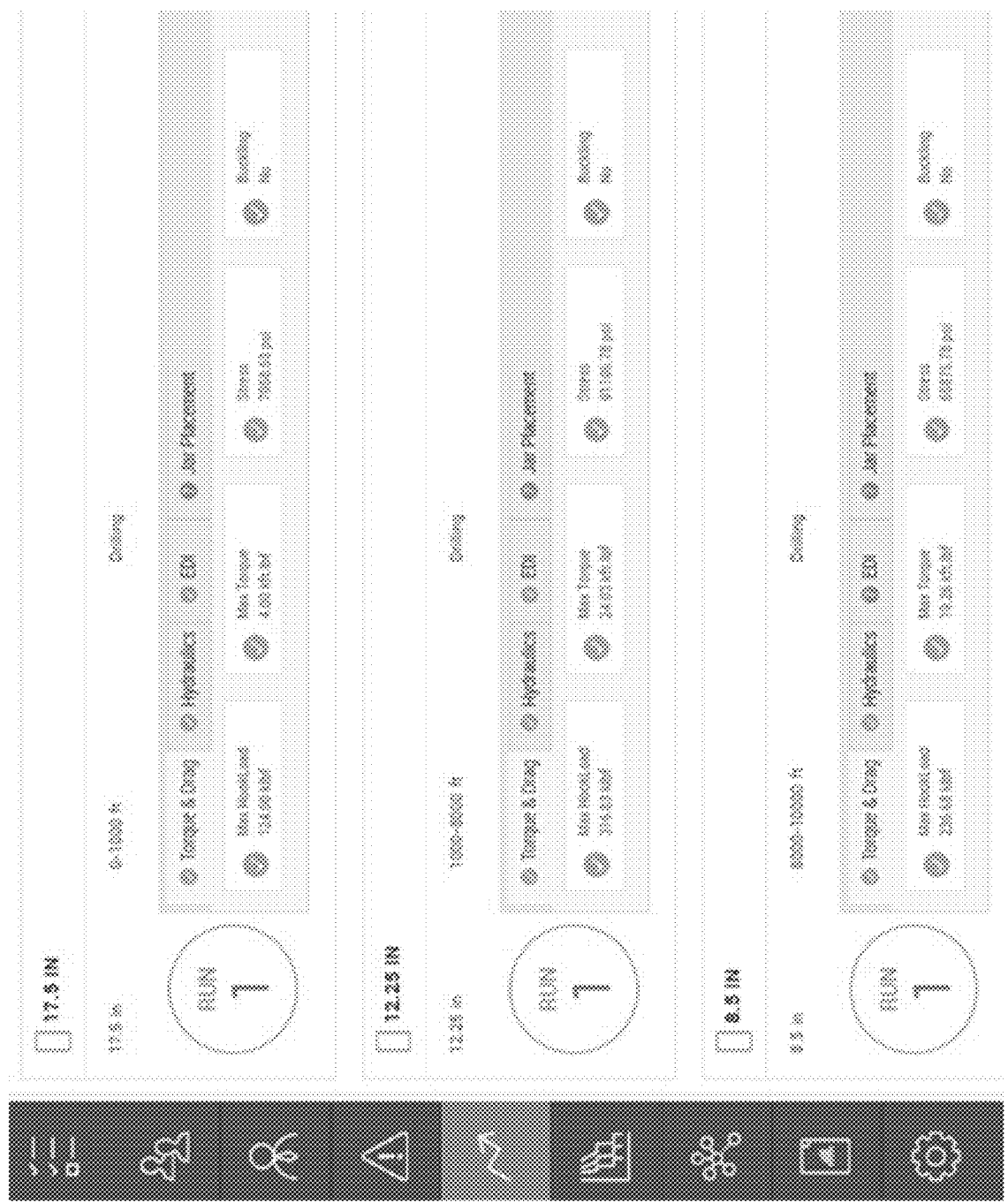
FIG. 6 illustrates a display of an output of an engineering assessment for a well plan using specified parameters, according to an embodiment.

The method 400 may proceed to receiving drilling parameters for a new well, as at 406, and determining that the drilling parameters meet engineering specifications for well equipment, as at 408. A well plan may specify many different drilling parameters. FIG. 5 illustrates plots of four examples of such drilling parameters, namely, over balance pressure, flow rate, rotation rate, and bit depth. These drilling parameters may be fed to a model of the subterranean domain, using the drilling system components selected, in order to determine that the drilling parameters meet engineering specifications for the well equipment, as at 408. An example of the output of such a model is shown in FIG. 6. This may be a threshold determination; if the drilling parameters result in loads on the equipment that exceed the equipment's capabilities, the drilling parameters may be rejected, or the well equipment may be changed.

The method 400 may proceed to generating a drilling risk profile for the new well, using the machine learning model, based on the drilling parameters, as at 410. As mentioned above, the machine learning model may be trained using previously identified risk inferences in the offset well data, or through observations of drilling risk in association with drilling parameters in the offset well data. The machine learning model may thus be configured to associate certain drilling parameters, conditions, etc., with certain risks, and thereby quantify the risks as a value, e.g., a percentage, ranking, etc. This value may be compared with risk tolerance values, which may be predetermined or otherwise devised, in order to establish whether the risk is acceptable, or to qualify the risk as high, medium, low, etc.

Figure 7:
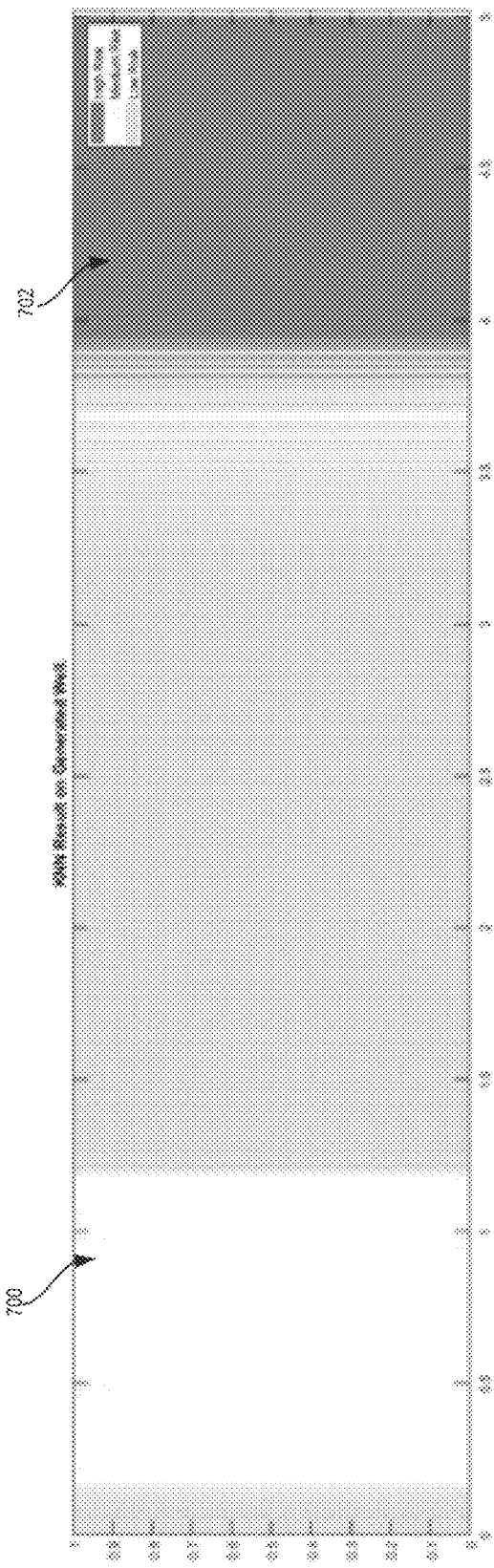
FIG. 7 illustrates a view of a risk profile for a plan that meets engineering specifications, according to an embodiment.

The drilling risk profile may visually describe levels of drilling risk in the well with respect to time. FIG. 7 illustrates an example of a risk profile 700. In this example, the risk profile 700 includes three levels of risk, high, medium, and low, which may be identified by the machine learning model based on the offset data. Further, the x-axis represents time (or more specifically, in this case, sample number), and the y-axis represents is the risk indicator of the stuck-pipe events. If the computed risk (likelihood of the drilling events) is higher than a certain threshold value, the risk profile area may change color (represented in gray in FIG. 7).

The drilling risk profile 700 of FIG. 7 may correspond to the drilling parameters of FIG. 6, which were used in the engineering analysis of block 408 (the results of which are shown in FIG. 5). Thus, even though the drilling parameters passed the engineering analysis in block 408, the machine learning model's drilling risk profile indicates an area 702 of high risk.

Figure 8:
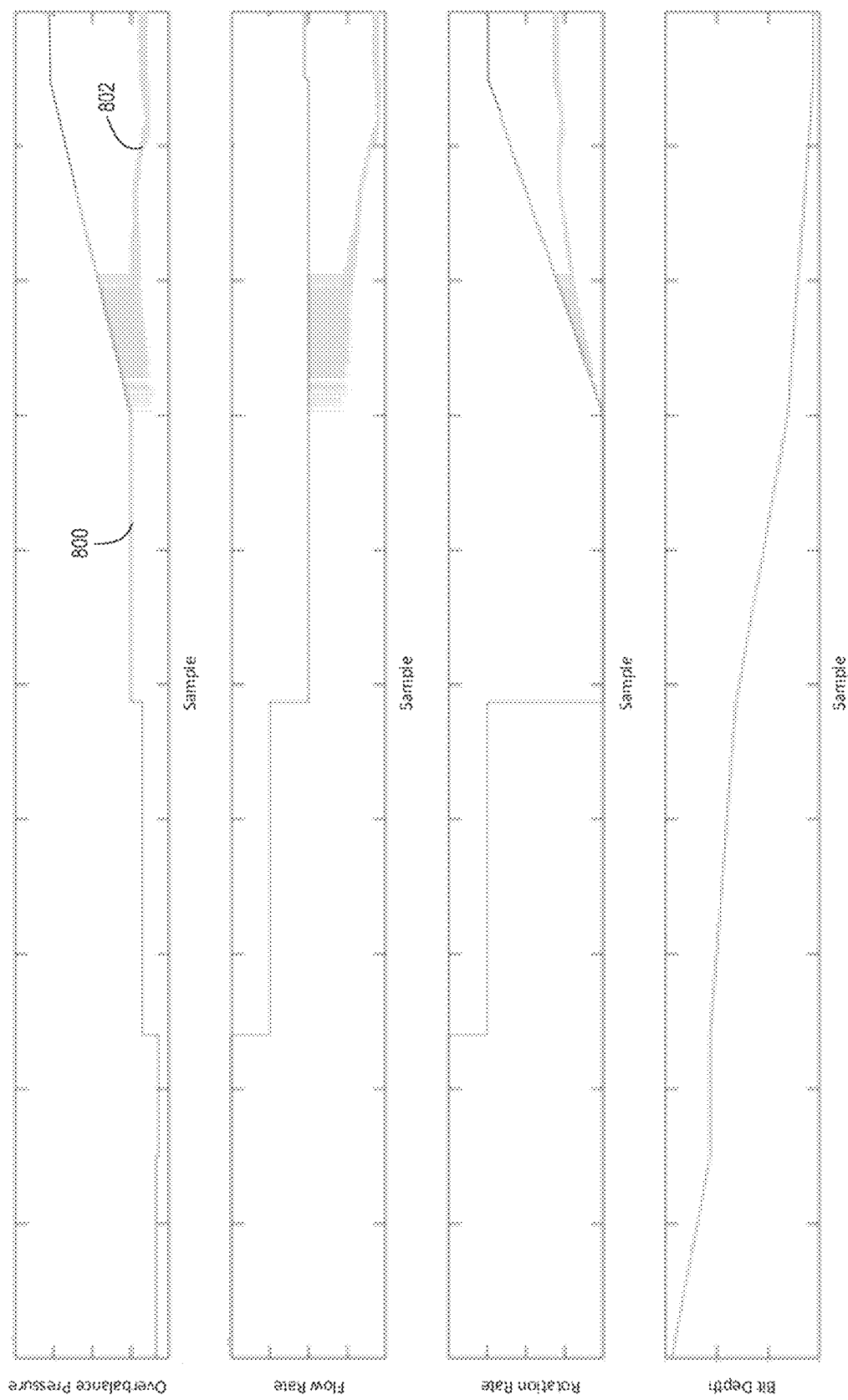
FIG. 8 illustrates plots of the example drilling parameters along with recommended adjustments thereto, according to an embodiment.

In response to one or more high risk areas being identified, the method 400 may proceed to adjusting one or more of the drilling parameters based on the drilling risk profile, as at 412. As shown in FIG. 8, an automated system may suggest deviations from the initial plan. For example, in over balance pressure, the initial plan 800 may be deviated from, as indicated at 802 in the later samples (corresponding to the area of high risk 702), toward the right of the plot. For correcting the expected risks raised by Pre-Drill advisor, the controllable drilling parameters (mud weight, flowrate, drill-string velocity, speed (revolutions-per-minute or RPM), and rate of penetration (ROP)) may be adjusted. For example, a Nearest Neighbor Search (NNS) algorithm may be employed to select settings within time and cost as shown in the FIG. 9. Other search algorithms may also be employed, such as grid-search techniques, depending, for example, on the reliability of the mitigation plan, computational cost, and speed.

Figure 9:
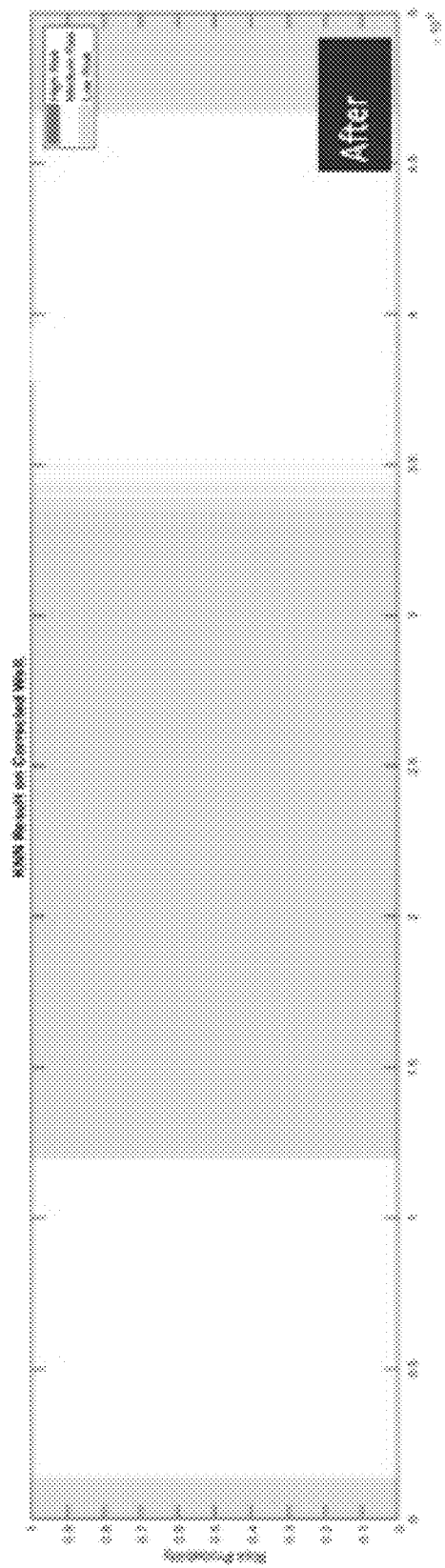
FIG. 9 illustrates a view of a risk profile for the plan implementing the recommended adjustments, according to an embodiment.
Figure 10:
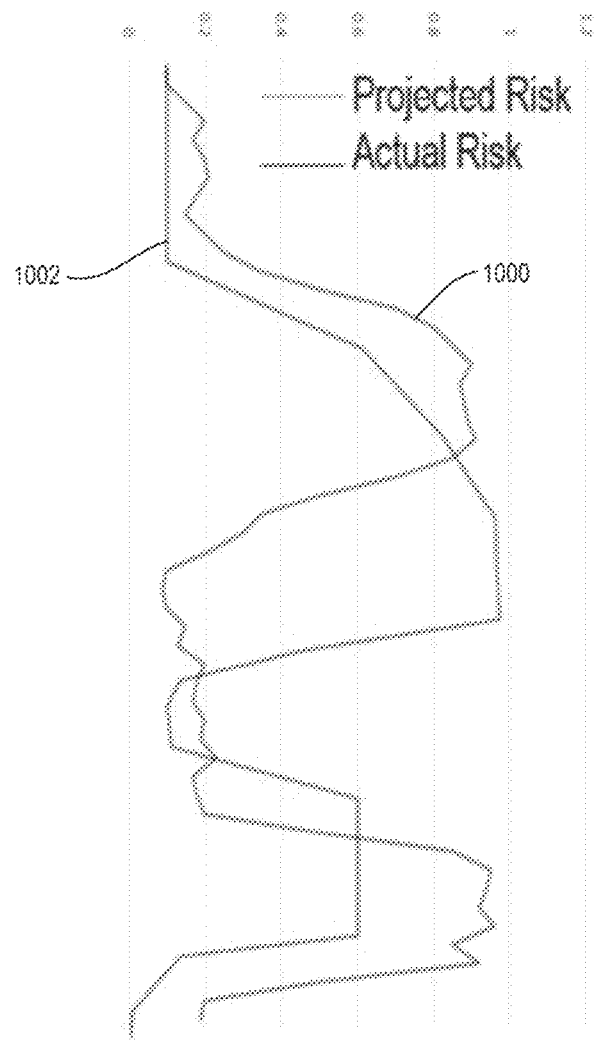
FIG. 10 illustrates a plot of projected risk from offset wells, according to an embodiment.

FIG. 10 illustrates a new risk profile, generated after deviating from the initial plan 800 according to the adjustments to the parameters illustrated in FIG. 9. As can be seen, the area of high risk is no longer present.

The remaining risks may be deemed acceptable, and thus the method 400 may proceed to drilling a well using the drilling parameters, as at 414. During the drilling, however, the method 400 may continue, e.g., in real-time, to evaluate risk. For example, the method 400 may include receiving measurements taken while drilling the well using the drilling parameters, as at 416. These measurements may then be fed to the machine learning model, which may again evaluate the risks associated with the drilling parameters, and may update the risk profile based in part on these measurements, as at 418. The measurements may include all the real-time drilling measurements (e.g. hookload, surface weight on bit, flow rate, rotation rate, stand pipe pressure, equivalent circulating density) and contextual information (e.g. mud density, wellbore geometry, and geomechanics information) which are used for building the machine learning model. If the risk profile again indicates that high risk areas are upcoming, the method 400 may loop back to adjusting one or more of the drilling parameters at 412 and iteratively update the drilling parameters, again, potentially in real time as drilling is underway. As shown in FIG. 10, the projected risk (i.e., the risk established prior to drilling), represented by line 1000, may be modified to more accurately reflect the drilling conditions as those drilling conditions become known based on the measurements taken during the drilling process. As such, the "actual" risk 1002 may be determined, which may be different from the projected risk, as can be seen in FIG. 10.

Figure 11:
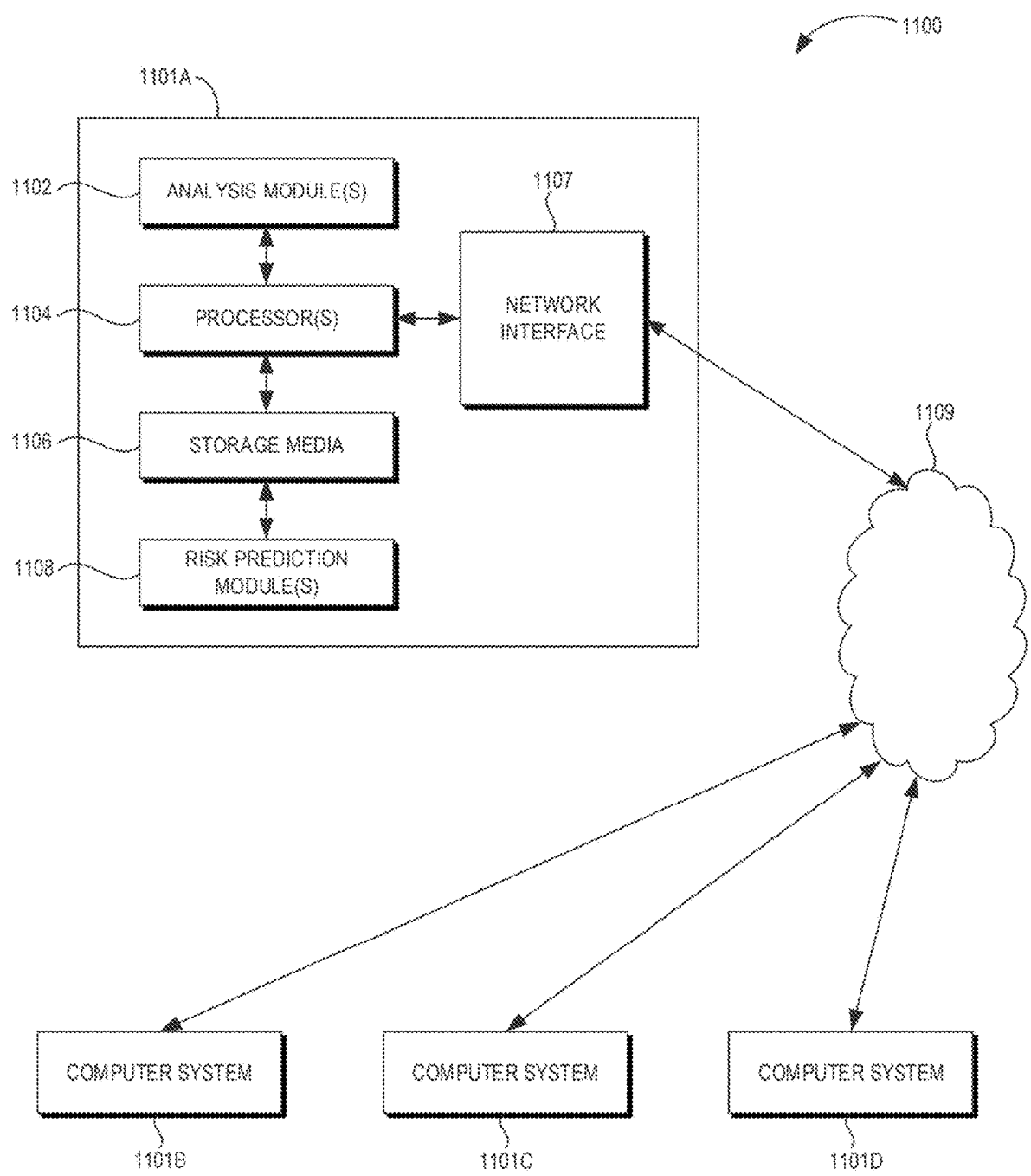
FIG. 11 illustrates a schematic view of a computing system, according to an embodiment.

In some embodiments, the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis modules 1102 that are configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor may include a microprocessor, microcontroller, processor module or subsystem, programmable integrated circuit, programmable gate array, or another control or computing device.

The storage media 1106 may be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1100 contains one or more risk prediction module(s) 1108. In the example of computing system 1100, computer system 1101A includes the risk prediction module 1108. In some embodiments, a single risk prediction module may be used to perform some aspects of one or more embodiments of the methods disclosed herein. In other embodiments, a plurality of risk prediction modules may be used to perform some aspects of methods herein.

It should be appreciated that computing system 1100 is merely one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
   querying a database to obtain offset well data collected while drilling previously drilled wells;
   identifying at least one risk with respect to a planned well based on the offset well data;
   generating a machine learning model that quantifies the at least one risk in the planned well based on the at least one risk that was identified based on the offset well data;
   predicting at least one drilling risk based on the machine learning model, wherein a drill plan that includes drilling parameters is adjusted based on the at least one predicted drilling risk, and wherein predicting the at least one drilling risk based on the machine learning model includes completing reinforcement learning to combine probabilities with connected reasons to predict the at least one drilling risk; and
   drilling the planned well using the drilling parameters after adjusting the drilling parameters based on the at least one predicted drilling risk.

2. The method of claim 1, wherein the database stores risks and hazards that have been encountered while drilling the previously drilled wells.

3. The method of claim 1, wherein determining if the at least one risk is identified includes transforming data measurements included within the offset well data into an actionable insight, wherein the offset well data includes at least one automatic risk inference.

4. The method of claim 3, wherein generating the machine learning model comprises training the machine learning model to predict the drilling risks based on the at least one automatic risk inference.

5. The method of claim 1, wherein completing the reinforcement learning comprises using a Bayesian Belief Network to combine the probabilities with the connected reasons to predict the at least one drilling risk.

6. The method of claim 1, wherein predicting the at least one drilling risk based on the machine learning model includes predicting at least one of: a risk of differential sticking in the planned well, or a risk of solid-induced pack-off in the planned well.

7. The method of claim 1, further including generating a visual representation of the at least one drilling risk that includes a value that represents a likelihood of the at least one drilling risk being realized while drilling the planned well.

8. A system comprising:
   a processor;
   memory accessible by the processor;
   processor-executable instructions stored in the memory and executable to instruct the system to:
      query a database to obtain offset well data collected while drilling previously drilled wells;
      identify at least one risk with respect to a planned well based on the offset well data;
      generate a machine learning model that quantifies the at least one risk in the planned well based on the at least one risk that was identified based on the offset well data;
      predict at least one drilling risk based on the machine learning model, wherein a drill plan that includes drilling parameters is adjusted based on the at least one predicted drilling risk, and wherein the at least one drilling risk predicted based on the machine learning model is predicted at least in part by completing reinforcement learning to combine probabilities with connected reasons to predict the at least one drilling risk; and
      generate a visual representation, in a graphical user interface configured to display data related to the drill plan, of the at least one drilling risk that includes a value that represents a likelihood of the at least one drilling risk being realized while drilling the planned well.

9. The system of claim 8, wherein the database stores risks and hazards that have been encountered while drilling the previously drilled wells.

10. The system of claim 8, wherein the instructions further instruct the system to transform data measurements included within the offset well data into an actionable insight, wherein the offset well data includes at least one automatic risk inference.

11. The system of claim 10, wherein the instructions further instruct the system to train the machine learning model to predict the drilling risks based on the at least one automatic risk inference.

12. The system of claim 8, wherein completing the reinforcement learning comprises using a Bayesian Belief Network to combine the probabilities with the connected reasons to predict the at least one drilling risk.

13. The system of claim 8, wherein the instructions further instruct the system to predict at least one of:
   a risk of differential sticking in the planned well or a risk of solid-induced pack-off in the planned well.

14. The system of claim 8, wherein the instructions further instruct the system to drill the planned well using the drilling parameters after adjusting the drilling parameters based on the at least one predicted drilling risk.

15. The system of claim 8, wherein the instructions further instruct the system to generate a visual representation of the at least one drilling risk that includes a value that represents a likelihood of the at least one drilling risk being realized while drilling the planned well.

16. A non-transitory computer-readable storage medium storing instructions that when executed by a computer, which includes a processor, perform a method, the method comprising:
   querying a database to obtain offset well data collected while drilling previously drilled wells;

identifying at least one risk is identified with respect to a planned well based on the offset well data;

generating a machine learning model that quantifies the at least one risk in the planned well based on the at least one risk that was identified based on the offset well data;

predicting at least one drilling risk based on the machine learning model, wherein a drill plan that includes drilling parameters is adjusted based on the at least one predicted drilling risk, and wherein predicting the at least one drilling risk based on the machine learning model includes completing reinforcement learning to combine probabilities with connected reasons to predict the at least one drilling risk, and adjusting a physical drilling operation in response to adjusting the drill plan based on the at least one predicted drilling risk.

17. The non-transitory computer-readable storage medium of claim 16, wherein predicting the at least one drilling risk based on the machine learning model includes completing the reinforcement learning using a Bayesian Belief Network to combine the probabilities with the connected reasons to predict the at least one drilling risk.

18. The non-transitory computer-readable storage medium of claim 16, wherein predicting the at least one drilling risk based on the machine learning model includes predicting at least one of: a risk of differential sticking in the planned well, or a risk of solid-induced pack-off in the planned well.

* * * * *